United States Patent [19]
Yamamoto et al.

[11] Patent Number: 5,583,557
[45] Date of Patent: Dec. 10, 1996

[54] IMAGE FORMING APPARATUS WHICH CORRECTS A DEVIATION IN A DISTANCE BETWEEN PLURAL LIGHT BEAMS

[75] Inventors: Hiroyuki Yamamoto; Toshihiro Motoi; Kouichi Takaki, all of Hachioji, Japan

[73] Assignee: Konica Corporation, Tokyo, Japan

[21] Appl. No.: 264,784

[22] Filed: Jun. 23, 1994

[30] Foreign Application Priority Data

Jun. 29, 1993 [JP] Japan .................................. 5-159472

[51] Int. Cl.$^6$ ................................................ H04N 1/21
[52] U.S. Cl. ................................. 347/235; 347/250
[58] Field of Search .................................. 347/248, 235, 347/250, 234

[56] References Cited

U.S. PATENT DOCUMENTS 4,206,348  6/1980  Davy et al. .
4,714,960  12/1987  Laakmann ............................. 358/206
5,105,296  4/1992  Cho et al. .

FOREIGN PATENT DOCUMENTS 0412038  2/1991  European Pat. Off. .

OTHER PUBLICATIONS

IBM Technical Disclosure Bulletin, vol. 15, No. 1, Jun. 1992, New York, pp. 5–6; D. H. Casler et al, "Deflection Sensor for Optical Scanners".

Primary Examiner—Mark J. Reinhart
Attorney, Agent, or Firm—Frishauf, Holtz, Goodman, Langer & Chick

[57] ABSTRACT

In an image forming apparatus for simultaneously recording plural image lines on a recording medium by scanning simultaneously with plural light beams along parallel scanning lines in a primary scanning direction, two light beam detectors each having a starting-side are arranged in such a way that the starting-sides are not in parallel to each other so that the distance between the starting-sides differs depending on the scanning line. The difference in the distances of two light beams is measured, and the deviation between the two light beams is determined on the basis of the difference in the distances.

5 Claims, 15 Drawing Sheets

IMAGE FORMING APPARATUS WHICH CORRECTS A DEVIATION IN A DISTANCE BETWEEN PLURAL LIGHT BEAMS

BACKGROUND OF THE INVENTION

The present invention relates to an image forming apparatus, and, in more detail, relates to an image forming apparatus in which a plurality of beams of light simultaneously scan a recording medium in a direction parallel to the primary scanning direction so that a plurality of lines are simultaneously recorded. (To differentiate deviation of beams of light from deviation of times, deviation of beams of light will be defined as slippage in this specification.) Particularly, the present invention relates to technology to detect slippages (as defined above) of the optical axis of the plurality of beams of light.

In an image forming apparatus in which laser beams (beams of light), modulated according to an image signal, are reflected by a rotational polygonal mirror, and caused to scan a recording medium so that image information is recorded, the following has been widely known: the image forming apparatus is structured in the manner that a plurality of laser beams are used and a plurality of lines are simultaneously recorded, in order to increase the recording speed (refer to Japanese Patent Publication Open to Public Inspection No. 188713/1992).

SUMMARY OF THE INVENTION

In the case where a plurality of laser beams are caused to simultaneously scan the recording medium as described above, scanning positions of a plurality of laser beams are deviated in the primary scanning direction or secondary scanning direction, causing problems in which accurate image formation is adversely influenced.

In view of the above described problems, an object of the present invention is to measure slippages of the optical axis of laser beams, particularly, in the secondary scanning direction by a simple structure, in an image forming apparatus which is structured in the manner that a plurality of laser beams are used for recording the image, and further to provide an appropriate apparatus to detect slippages of the optical axis in the secondary scanning direction and slippages of the optical axis in the primary scanning direction.

Accordingly, the image forming apparatus, according to the present invention, causes a plurality of laser beams to simultaneously scan the recording medium in the direction parallel to the primary scanning direction for simultaneously recording a plurality of lines. The image forming apparatus comprises: two light beam detection means which are arranged in the primary scanning direction so that an end of the front of the primary scanning direction of each light beam detection area is not in parallel with each other; a first time difference measuring means, in which only one light beam of a plurality of light beams respectively scans/enters two light beam detection means, and the difference of time in which the light beam is detected, is measured by two light beam detection means; a second time difference measuring means, in which only another light beam, different from the light beam used for scanning in the first time difference measuring means, respectively scans/enters two light beam detection means, and the difference of time, in which the light beam is detected, is measured by two light beam detection means; a time deviation calculation means in which deviations between time differences, which are respectively measured by the first and second time difference measuring means, are calculated; and a secondary scanning direction slippage detection means in which the slippage of an interval between two light beams in the secondary scanning direction perpendicular to the primary scanning direction is detected by comparing the deviation calculated by the time deviation calculation means with the reference value, wherein two light beams are selectively used for scanning respectively in the first and second time difference measuring means.

Further, the image forming apparatus, according to the present invention, is structured in the manner that: a plurality of light beams simultaneously scan the recording medium in the direction parallel to the primary scanning direction so that a plurality of lines are simultaneously recorded; at least three light beam detection means are arranged in the primary scanning direction; and ends of the front of the primary scanning direction of the light beam detection areas of the light beam detection means are combined in two ways so that some of those ends are not parallel, and the other ends are parallel with each other.

According to the image forming apparatus structured as above, since two light beam detection means are arranged in the primary scanning direction so that ends of the front of the primary scanning direction of the light beam detection areas are not parallel with each other, the distance between ends is changed along the secondary scanning direction perpendicular to the primary scanning direction.

Accordingly, in the case where only one light beam is detected by the two light beam detection means, the time interval of rise of the light beam detected by each light beam detection means is changed corresponding to the scanning position in the secondary scanning direction.

Here, when the time intervals of rise of two light beams, which are compared with each other, are measured, the difference between time intervals of light beams expresses a value correlated to the interval of each light beam in the secondary scanning direction, and the change of the difference between the time intervals shows the slippage of the optical axis in the secondary scanning direction (the change of intervals of light beams in the secondary scanning direction).

In the image forming apparatus according to the present invention, at least three light beam detection means are provided so that: a combination of the light beam detection means is provided in which ends of the front of the primary scanning direction in the light beam detection area are not parallel with each other; and also a combination of the light beam detection means is provided in which ends of the front of the primary scanning direction are parallel with each other, so as to apply to the measurement of the intervals of light beams in the secondary scanning direction as described above.

When a combination of the light beam detection means, in which ends of the fronts are parallel with each other, are used, the slippage of the scanning position in the secondary scanning direction does not influence the time interval in which the light beam is detected by each light beam detection means, and the positional relationship in the primary scanning direction can be independently used for the detection of a slippage in the primary scanning direction in a plurality of light beams.

DETAILED DESCRIPTION OF THE PREFERRED EMBODIMENT

An example of the present invention will be described below.

Figure 1:
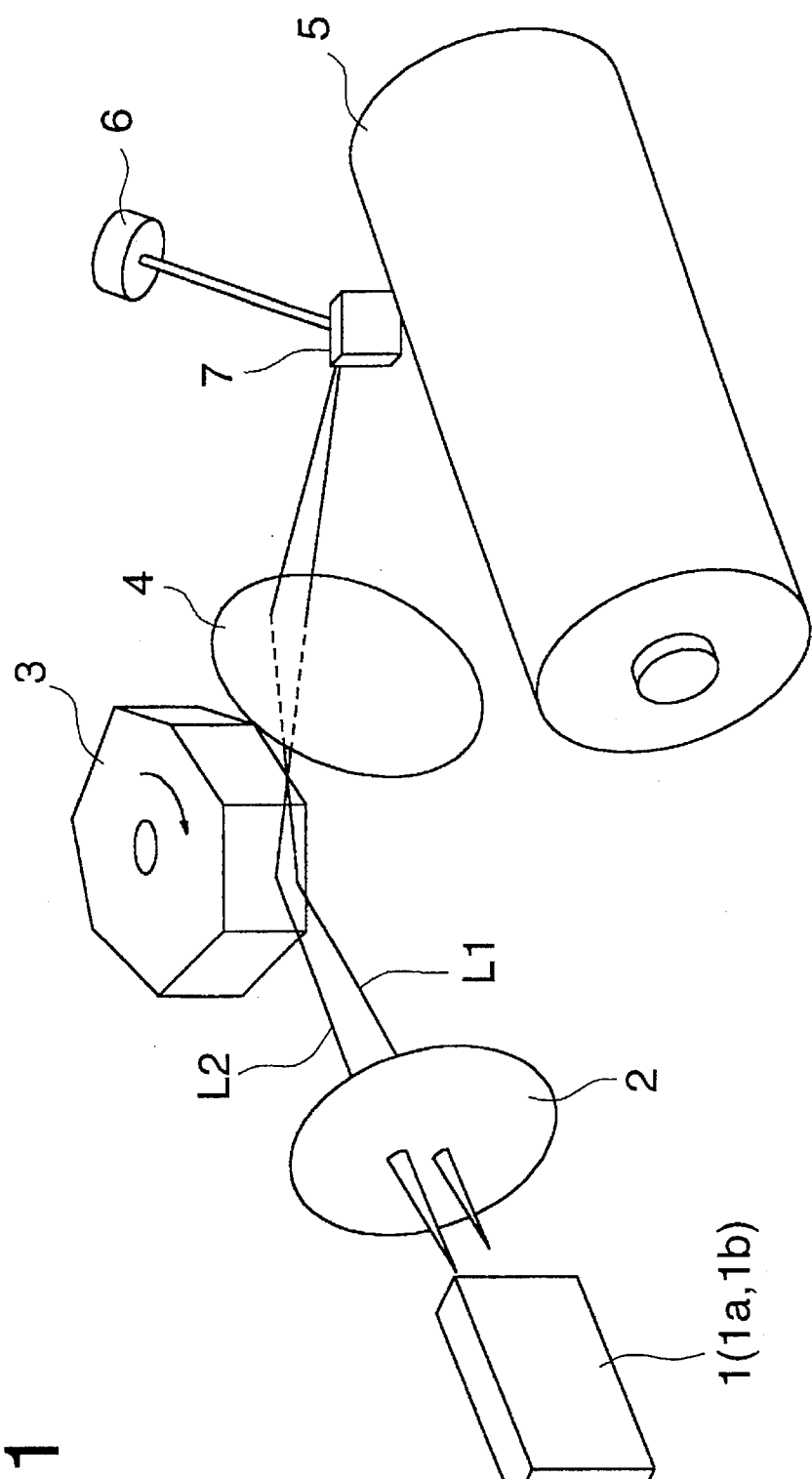
FIG. 1 is a perspective view showing an image exposure system of an example of the present invention.

FIG. 1 is a view showing an image exposure system of a laser printer as an example of an image forming apparatus according to the present invention. The printer in the example is a type in which two laser beams (light beams) L1 and L2, internally modulated corresponding to image data, scan in parallel with the primary scanning direction, so that two lines are simultaneously recorded.

In FIG. 1, a light source unit 1 is structured in the manner that two semiconductor lasers 1a and 1b are arranged in a row. Two diffused beams of light emitted from the light source 1 become two parallel laser beams L1 and L2 through a condenser lens 2.

Two laser beams L1 and L2 irradiate a polygonal mirror 3, and these two laser beams reflected by the polygonal mirror 3 scan a photoreceptor drum (recording medium) 5 through an fθ lens 4.

The photoreceptor drum 5 is synchronously rotated with the primary scanning of laser beams L1 and L2, wherein, laser beams L1 and L2 and the photoreceptor drum 5 are relatively moved in a secondary direction (direction perpendicular to the primary scanning direction), and two dimensional image recording is carried out.

As described above, exposure of one line, and that of the other line, corresponding to image data, are simultaneously carried out, and a latent image is formed on the photoreceptor drum 5 (recording medium). Toners, charged with reverse polarity, adhere to the latent image, and the latent image is developed. After that, a recording sheet is superimposed on the toner image, electric charges with reverse polarity to corona charging polarity are supplied to the recording sheet from the rear of the recording sheet by a corona charger, and the toner image is transferred onto the recording sheet.

Scanning starting points of laser beams L1 and L2 reflected by the polygonal mirror 3 are detected by an index sensor 6 provided on the front of the scanning area.

A reflection mirror 7 is used for guiding laser beams L1 and L2 to the index sensor 6 when laser beams L1 and L2 irradiate the front of the scanning lines.

The index sensor 6 is structured in the manner that: four sensors (light beam detection means) A through D, which respectively output detection signals, are integrally provided; sensors A through D are arranged in the primary scanning direction, and laser beams L1 and L2 scan the sensors in the sequence of A→B→D→C.

Light beam detection areas (light receiving areas) of sensors A through D are formed into four right triangles. Sensor A is located in the manner that: the longer of two sides, by which a right angle is formed in the detection area of the right triangle, is an end of the front of the primary scanning direction; and the longer side is perpendicular to the primary scanning direction (parallel with the secondary scanning direction). Sensor B is located in the manner that: the hypotenuse of the detection area of the right triangle is an end of the front of the primary scanning direction; and the hypotenuse crosses the primary scanning direction at an angle which is formed by the long side and the hypotenuse. Sensor D is located in the manner that: the located condition of the detection area of sensor A is turned upside down, when the secondary scanning direction is supposed to be at the top and bottom. Sensor C is located in the manner that the detection area is symmetrical with respect to the axis which is along sensor A and the secondary scanning direction.

Figure 2:
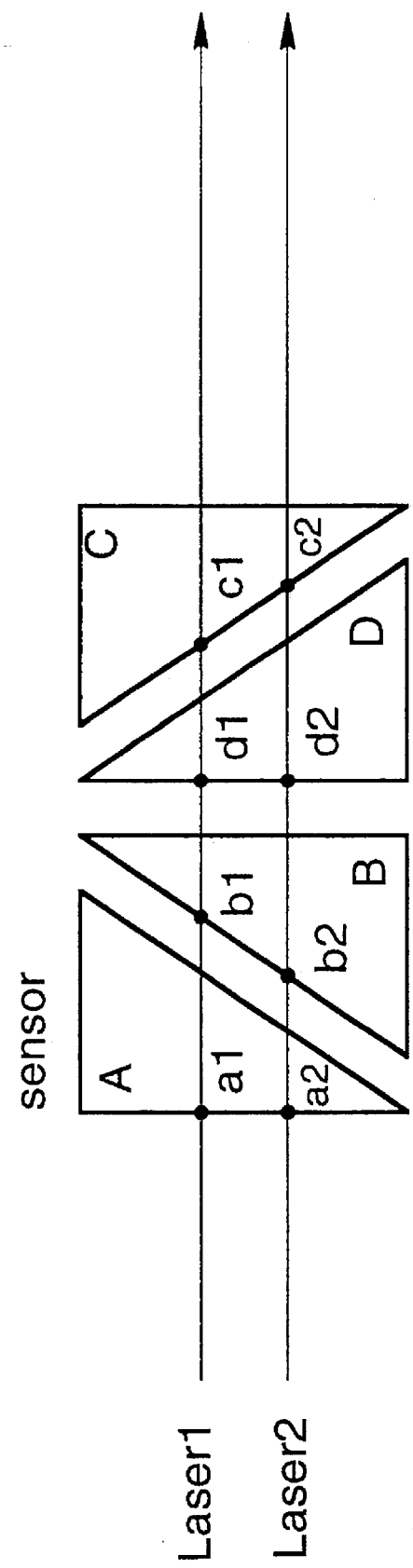
FIG. 2 is a view showing the detail of an index sensor.

Although sensors A and C shown in FIG. 2 are located in the manner that the longer of the two sides by which the right angle is formed is perpendicular to the primary scanning direction, the sensors may be located in the manner that the long side is parallel with the primary scanning direction.

Due to the arrangement of sensors A though D, ends of the front of the primary scanning direction of sensors A though D are positioned in the manner that: sensors A and D are parallel with each other along the secondary scanning direction; and sensors B and C are not parallel with each other, and directions of inclination are reversed with respect to the primary scanning direction.

In FIG. 2, a position of the front of the detection of laser beam L1 by sensor A (a position at which the beam detection signal rises) is shown by a1, and that of the laser beam L2 is shown by a2. In the same way, the position of the front of the detection of laser beam L1 by sensor B is shown by b1, and that of laser beam L2 is shown by b2. The position of the front of the detection of laser beam L1 by sensor C is shown by c1, and that of laser beam L2 is shown by c2. The position of the front of the detection of laser beam L1 by sensor D is shown by d1, and that of laser beam L2 is shown by d2.

Figure 3:
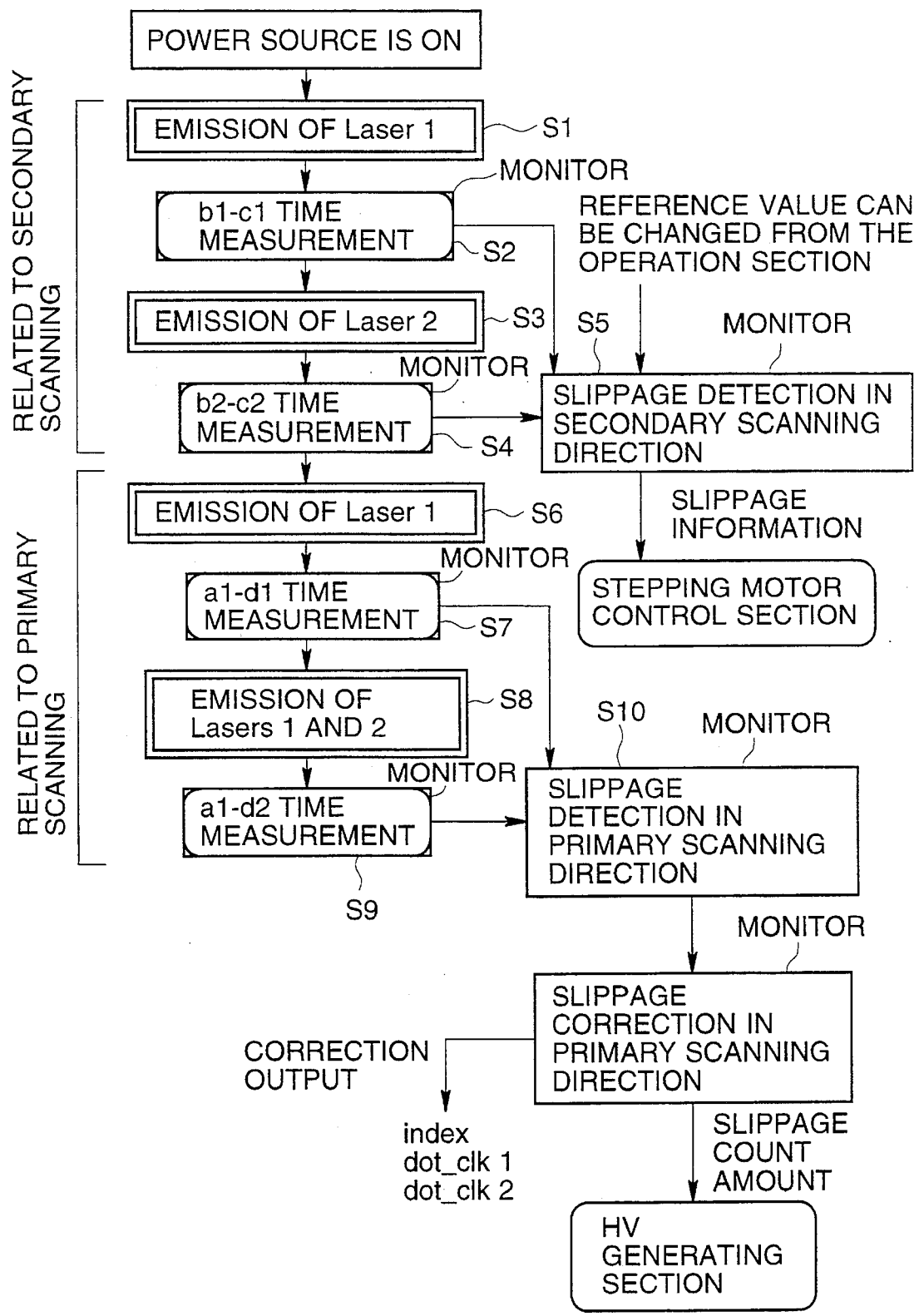
FIG. 3 is a flow chart showing the optical axis slippage detection in the primary and secondary scanning direction.

In this example, the slippage of the interval of laser beams L1 and L2 in the secondary scanning direction is measured by the above-described sensors A through D, as shown in the flow chart in FIG. 3.

The program shown in the flow chart in FIG. 3 is carried out every time the laser printer is turned on. Initially, only laser beam L1 is turned on, and the laser beam scans in the same way as in the case of the normal image recording (S1).

When laser beam L1 scans sensors A through D, the time (the difference of the detection time) T1 (refer to FIG. 4) from the rise of the beam detection by sensor B (b1) to the rise of the beam detection by sensor C (c1) is measured (S2).

The functions of S1 and S2 correspond to the first time difference measuring means.

Next, only laser beam L2 is turned on instead of the laser beam L2, and laser beam L2 scans in the same way as in the case of normal image recording (S3).

In the same way, when laser beam L2 scans sensors A through D, time T2 (refer to FIG. 4) elapsed from the rise of the beam detection by sensor B (b2) to the rise of the beam detection by sensor C (c2) is measured (S4).

The above-described functions of S3 and S4 correspond to the second time difference measuring means.

When the measurement of times T1 and T2 has been completed, an absolute value of the deviation T3 between times T1 and T2 is calculated.

Further, the difference between the reference value of deviation T3, corresponds to the case where the interval of laser beams L1 and L2 in the secondary scanning direction is normal, and deviation T3, which has been actually obtained in the above processing, is found as a value corresponding to the amount of slippage of the interval (S5). The function of S5 corresponds to the time deviation calculation means and the secondary scanning direction slippage detection means.

It is preferable that the reference value can be arbitrarily changed through an operation section of the laser printer.

Figure 4:
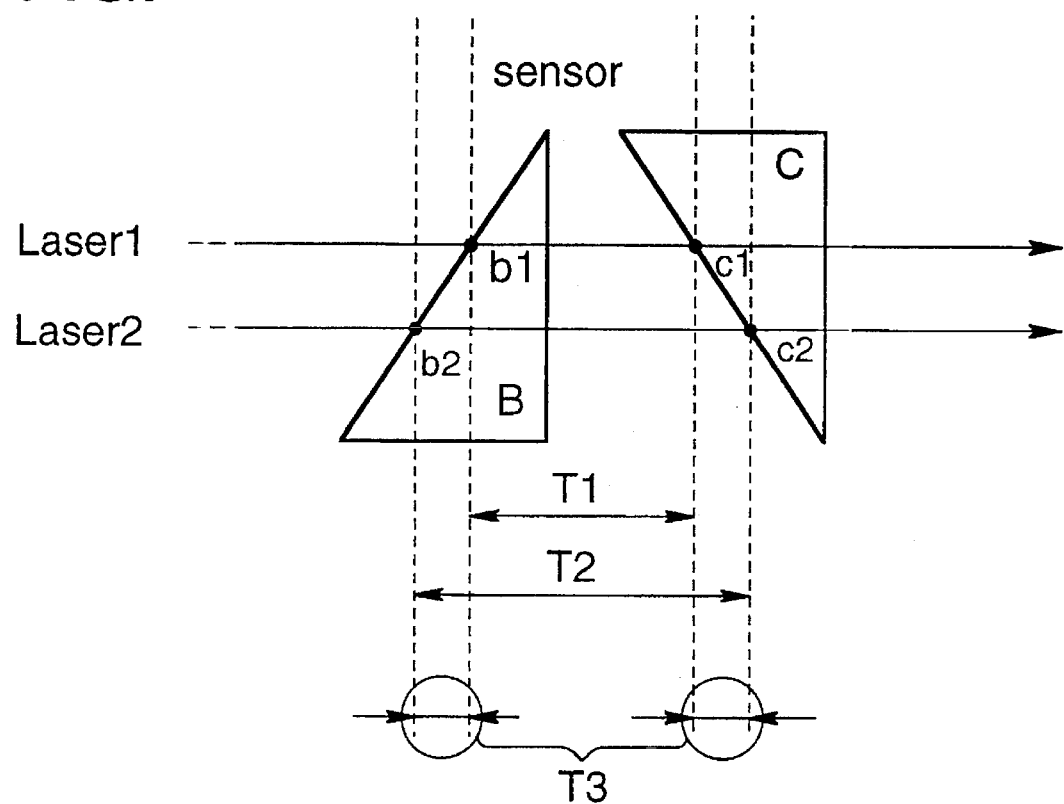
FIG. 4 is a view to explain slippage detection in the secondary scanning direction.

That is, when positions b1 and c1 in the secondary scanning direction, in which laser beam L1 is detected by sensors B and C, are assumed as the reference position, for example, it is assumed that the scanning position of laser beam L2 is deviated downward in FIG. 4 in the secondary scanning direction. In this case, since the system is structured in the manner that the interval of the ends of the front of the detection areas of sensors B and C is extended to both sides in the primary scanning direction as it comes downward in FIG. 4, positions b2 and c2, in the secondary scanning direction, in which laser beam L2 is detected by sensors B and C, are deviated as follows: position b2 is deviated to the front in the scanning direction, and position c2 is deviated to the rear end in the scanning direction. Accordingly, time T2 becomes longer and time T3 becomes longer with respect to the reference value.

Accordingly, when the deviation between time T3 and the reference value is found, the amount of slippage of the interval between laser beams L1 and L2 can be calculated according to information of the scanning speed and the angle of the hypotenuse in sensors B and C.

When the mechanism is provided in which the scanning position in the secondary scanning direction can be adjusted as disclosed in, for example, Japanese Patent Publication Open to Public Inspection No. 50809/1988, the interval in the secondary scanning direction of laser beams L1 and L2 can be adjusted to the regulated value by adjusting the scanning position in the secondary scanning direction of the laser beams L1 and L2 according to information of the calculated amount of the slippage.

Figure 5:
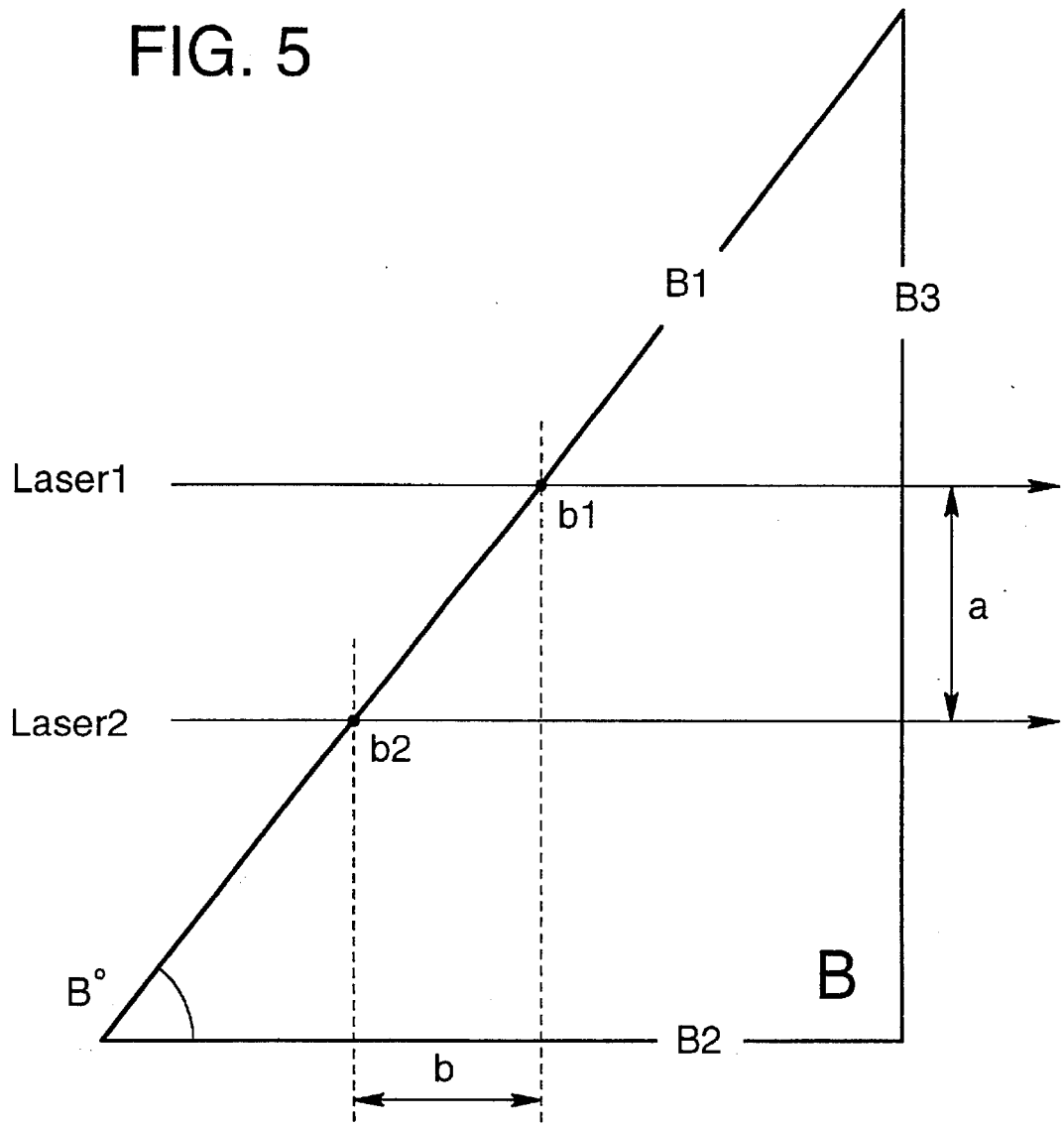
FIG. 5 is a view to explain the characteristics of slippage detection in the secondary scanning direction.
Figure 6:
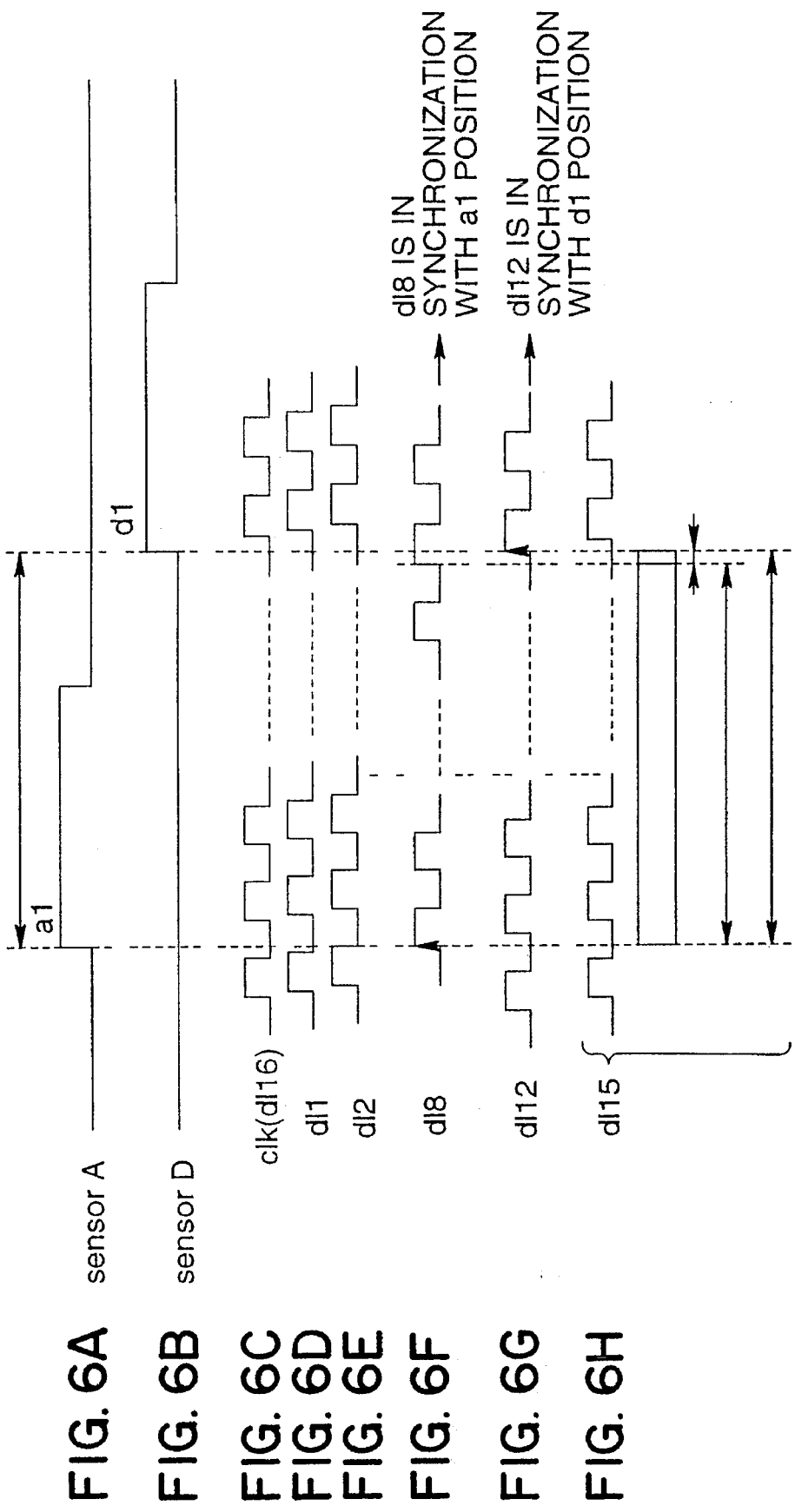
FIGS. 6A–6H is a time chart to explain the time measurement using a clock.

When the interval slippage in the secondary scanning direction of laser beams L1 and L2 is detected as described above, it is preferable that the angle B° shown in FIG. 5 is set as sharp as possible since the time interval caused by the slippage is fluctuated by the angle at which the hypotenuses of sensor B and C obliquely cross with respect to the primary scanning direction, in other words, it is preferable that the interval of the hypotenuses of the detection areas of sensors B and C suddenly changes along the secondary scanning direction. Further, angle B° may be determined corresponding to the accuracy of adjustment of the scanning position and the resolving power of the time measurement.

Further, the result of the measurement of times T1 and T2, and information of the finally calculated amount of slippage may be displayed on the display section provided in the laser printer.

In this connection, in this example, the measurement of times T1 and T2 is carried out as shown in FIGS. 6A–6H.

In FIGS. 6A–6H, although the case is shown where the time interval (time between a1 and d1), in which laser beam L1 is detected by sensors A and D, is measured, the measurement can also be carried out by the other combination of sensors A through D in the same way.

In FIGS. 6A–6H, the reference clock clk is successively delayed by 1/16 periods, and 16 kinds of delay clocks d10 (reference clock) through d115 are generated using digital delay lines. In FIGS. 6A–6H, only the clock clk, dl1, dl2, dl8, dl12, dl15 are shown, and the other delay clocks are omitted.

When, for example, the clock synchronized with the rise a1 of the detection signal of sensor A (a clock which initially rises just after the rise of the detection signal) is the clock dl8, the rise of the detection signal at the time of synchronization is initially counted, and then the rise of clock dl8 is successively counted.

When the detection signal of sensor D rises in the foregoing count, and the clock which is in synchronization with the rise (dl) of the detection signal is dl12, the difference between the time of outputs is obtained by the following calculation: the value, in which the number of the rise of the clock dl8 counted up to that time (the rise of the clock dl8 synchronized with the detection signal (a1) of sensor A is included) is lowered by 1, is multiplied by the clock period, so that a time value is obtained; the time value is added by the phase difference between clock dl8 and clock dl12 (which is 4/16 periods, and can be expressed as the delay clock number=dl4); and thereby the difference between output times (the interval between a1 and d1) of the detection signals by sensors A and D is obtained.

In the slippage detection in the secondary scanning direction, it is preferable that: times T1 and T2 are found by the above described calculation as the counted number of clocks and the delay clock number; the reference time corresponding to the regulated value of the interval is also given as a clock count number and a delay clock number; and the count number and the delay clock number are respectively calculated in the calculation of the time difference.

Figure 7:
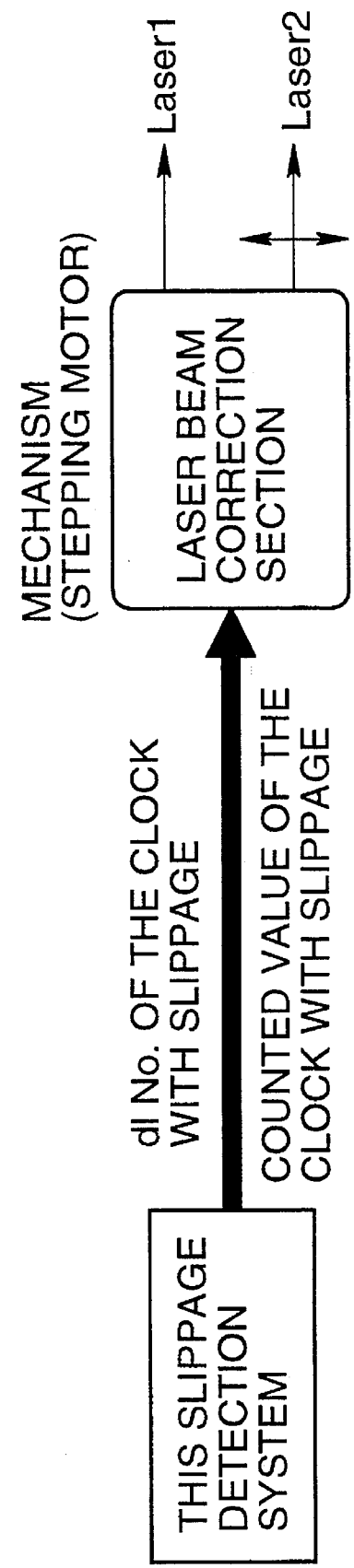
FIG. 7 is a block diagram showing the optical axis adjustment according to the result of the slippage detection.

In this case, information of the slippage in the secondary scanning direction is outputted to an adjusting mechanism (for example, a stepping motor) as the clock count number and the delay clock number (refer to FIG. 7).

Next, referring to FIG. 8, an example of a circuit, in which the time is measured as described above, and the slippage is detected according to the result of the measurement, will be specifically explained below.

Figure 8:
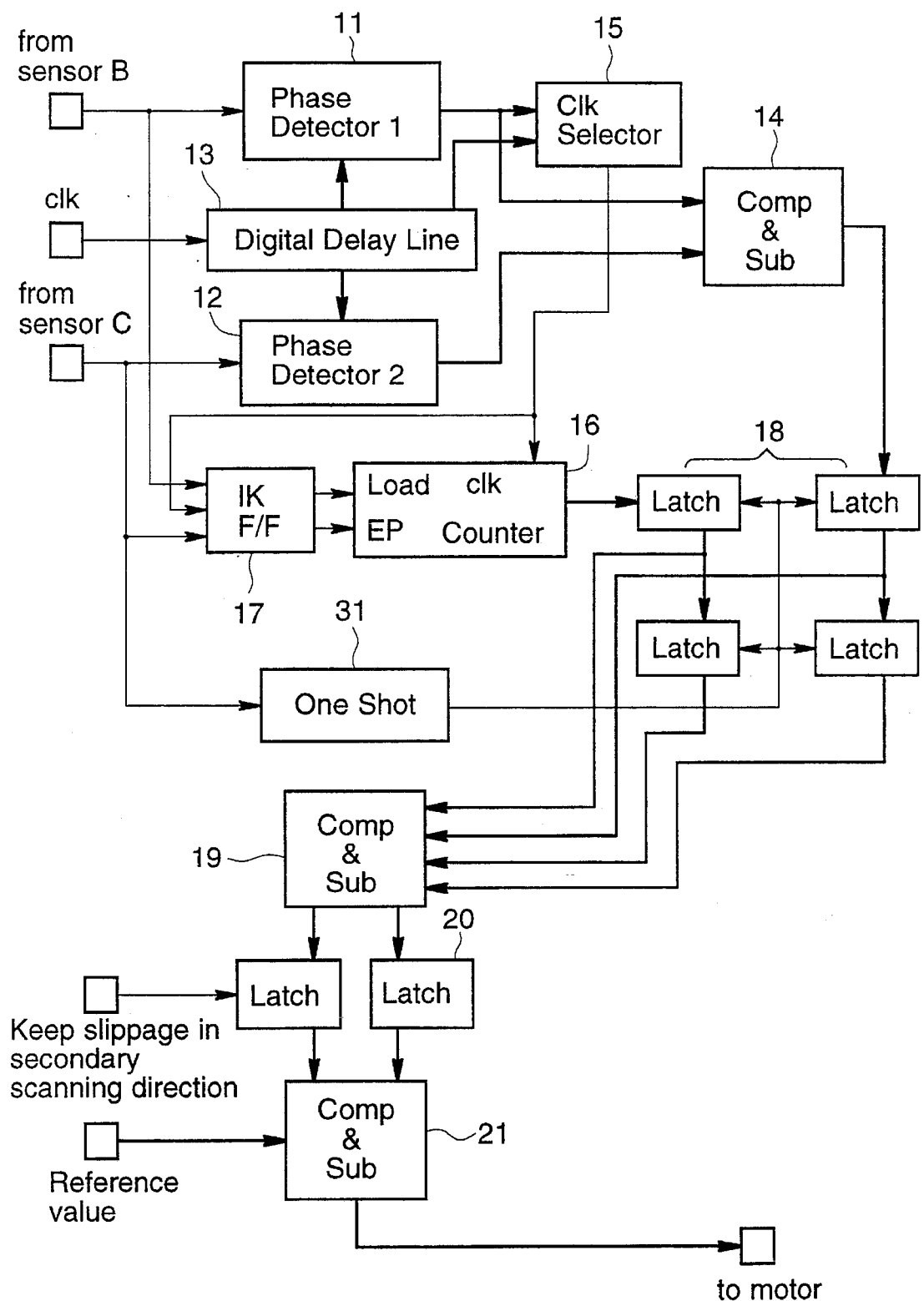
FIG. 8 is a block diagram showing the circuit composition in which the optical axis slippage detection in the secondary scanning direction is carried out.

In FIG. 8, the outputs of sensors B and C are respectively inputted into a phase detector (1) 11 and a phase detector (2) 12.

On the other hand, the reference clock clk is inputted into a digital delay line 13 and the clocks d10 through d115 are outputted from the digital delay line 13.

In the phase detectors (1) 11, and (2) 12, the delay clocks dt0 through dl15 synchronized with the rises of the detection signals of sensors B and C are respectively detected (refer to FIGS. 6A–6H), and the result of the detection is outputted to a phase difference calculation section 14.

In the phase difference calculation section 14, the phase difference ($\frac{1}{16}$ period units) between a clock synchronized with the detection timing of sensor B (b1 or b2) and a clock synchronized with the detection timing of sensor C (c1 and c2), that is, fractions within the clock period of the detection interval of the sensors B and C are found, and the result of that is stored in a latch circuit 18 corresponding to a one-shot pulse generated in a one-shot circuit 31 by the detection signal of sensor C.

The detection result by the phase detector (1) 11 is also outputted to a clock selector 15, and a delay clock synchronized with the detection signal of sensor B is selectively outputted from the clock selector 15 to a counter 16.

In the counter 16, the time interval between the rise b1 (b2) of sensor B and the rise c1 (c2) of the sensor C is measured by counting clocks outputted from the clock selector 15. A counting range of the counter 16 is controlled by a flip-flop 17 into which outputs from sensors B and C are inputted.

The counted value by the counter 16 is stored in a latch circuit 18 by a one-shot pulse.

Due to the foregoing, time T1 which is the detection interval by sensors B and C at the time when, for example, only laser beam L1 is turned on, is measured and stored in the latch circuit 18, and then, time T2, at the time when only laser beam L2 is turned on in the same way, is measured and stored in the latch circuit 18.

In the circuit structure shown in FIG. 8, the function as the first-time difference measuring means and the second-time difference measuring means is realized by: the phase detectors (1) 11 and (2) 12; the digital delay line 13; the phase difference calculation section 14; the clock selector 15; the counter 16; the flip-flop 17; the latch circuit 18; and the one-shot circuit 31.

When times T1 and T2 are obtained as the clock count number and the clock phase difference, the difference between times T1 and T2 is respectively calculated with respect to the clock count number and the clock phase difference in a time difference calculation section 19, which is the time deviation calculation means, and the results are temporarily stored in a latch circuit 20.

In a slippage calculation section 21, which is a secondary scanning slippage detection means, the reference value supplied from the operation section is compared with data stored in the latch circuit 20, and the slippage (an amount of change of the interval) of laser beams L1 and L2 in the secondary scanning direction is calculated, and the calculation result is outputted to a display section. The calculation result is also supplied to an adjusting mechanism and slippage in the secondary scanning direction is corrected.

In this connection, processing, in which only sensors B and C in sensors A through D are used for the detection of the slippage of laser beams L1 and L2 in the secondary scanning direction, and the slippage is adjusted, is explained above. However, it is preferable that the relationship of the scanning position of laser beams L1 and L2 in the primary scanning direction (the slippage in the primary scanning direction) is detected, and writing positions by laser beams L1 and L2 is controlled according to the detection result, for which sensors A and D are provided.

The content of processing for detecting the slippage in the primary scanning direction is shown in the flow chart in FIG. 3, following the slippage detection processing in the secondary scanning direction.

Figure 9:
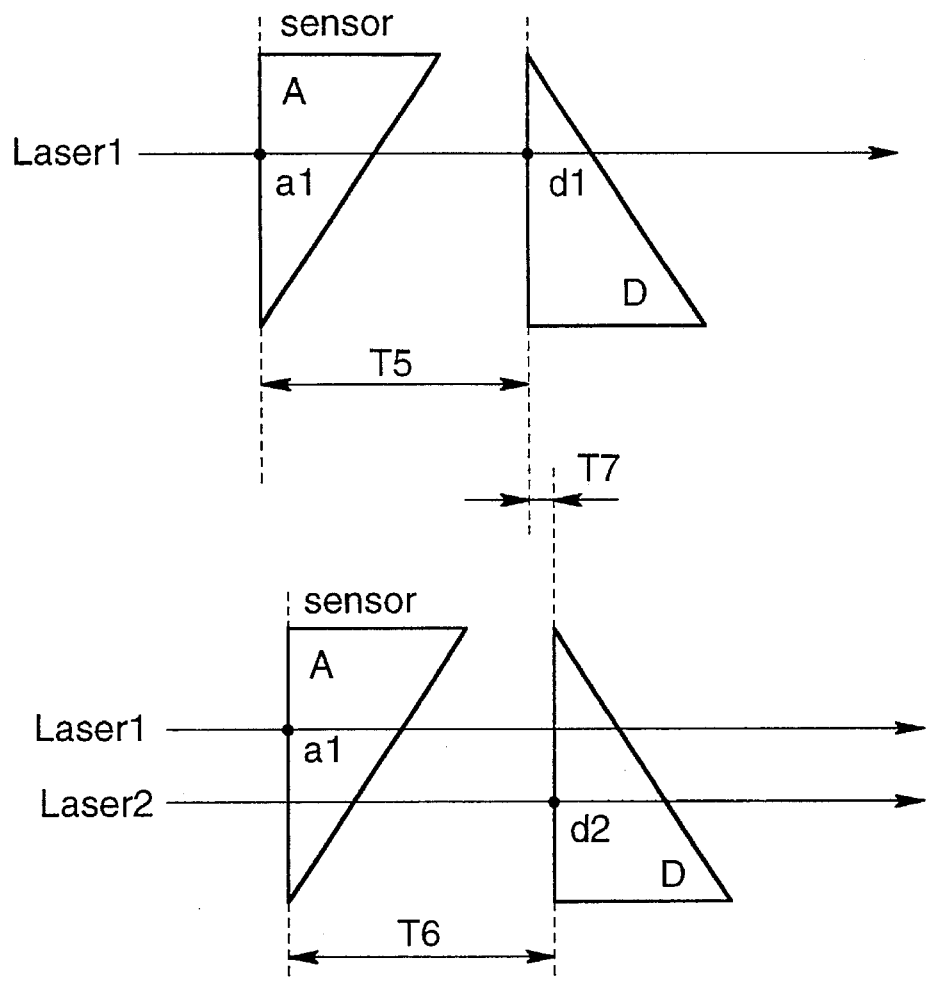
FIG. 9 is a view to explain the characteristics of the slippage detection in the primary scanning direction.
Figure 10:
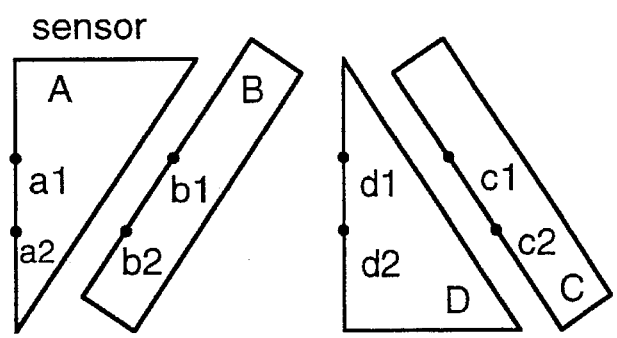
FIG. 10 is a view showing another example of sensor construction.
Figure 11:
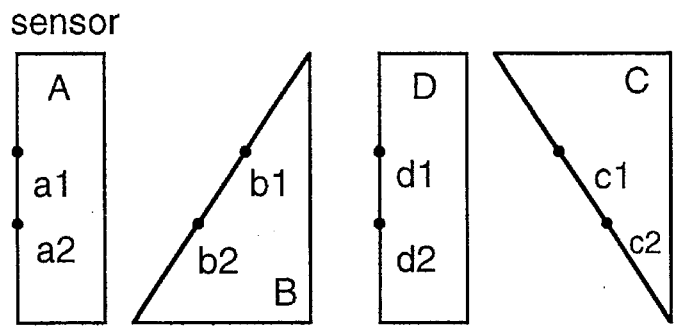
FIG. 11 is a view showing still another example of sensor construction.
Figure 12:
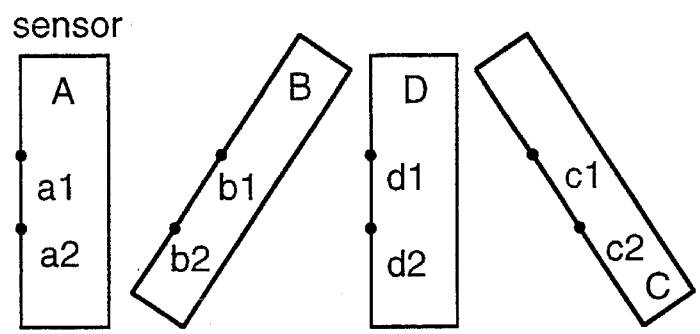
FIG. 12 is a view showing one more example of sensor construction.
Figure 13:
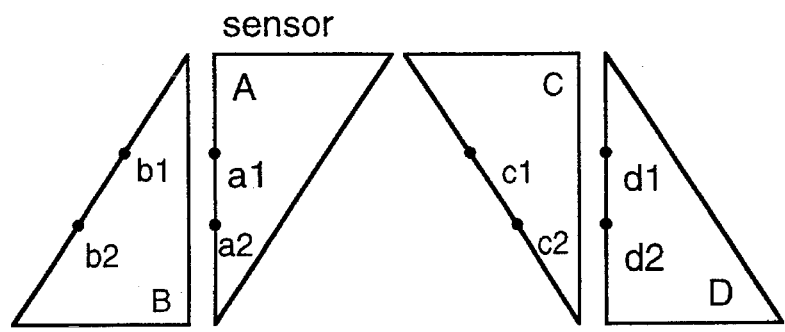
FIG. 13 is a view showing a further example of sensor construction.

Initially, only laser beam L1 is turned on (S6), and the difference of time T5 (refer to FIG. 9) between the rise (a1) at which laser beam L1 is detected by sensor A, and the rise (d1) at which laser beam L1 is detected by sensor D is measured (S7).

Since the ends of the front of the primary scanning direction in the light beam detection area of sensors A and D are parallel with each other in the secondary scanning direction (perpendicular to the primary scanning direction), the difference of time T5 is not influenced by the scanning position in the secondary scanning direction, and is determined only by the interval of the ends of the front of the primary scanning direction of sensors A and D, and the scanning speed.

Next, the mask control of laser beams L1 and L2 is conducted for scanning (S8) so that only laser beam L1 enters into sensor A and only laser beam L2 enters into sensor D. The difference of time T6 (refer to FIG. 9) between the time of rise (a1) at which laser beam L1 is detected by sensor A, and the time of rise (d2) at which laser beam L2 is detected by sensor D, is measured (S9).

The mask control may be carried out by the switching control of laser beams L1 and L2, or laser beam L1 and L2 may selectively enter into sensors A and D using a polarizing element or the like.

When laser beams L1 and L2 scan in the primary scanning direction without slippage, the difference of time T5 is equal to time T6. For example, when scanning of laser beam L1 is delayed and laser beam L2 scans, the delay is found by the following equation: T6–T5 (=T7) (S10: refer to FIG. 9).

Accordingly, in this case, when the writing starting time by the laser beam L2 is delayed with respect to that by the laser beam L1 by the foregoing time T7, image recording can be carried out without slippage in the primary scanning direction by two laser beams L1 and L2 by which scanning is conducted with slippage in the primary scanning direction.

Alternatively, the writing starting time by the laser beam L1 can be advanced with respect to that by the laser beam L2. In this case, image recording can be conducted without slippage. That is, it is possible to conduct the image recording without slippage by controlling the writing starting time of one of the laser beams with respect to the other one of laser beams.

The control of the writing position may be conducted so that the generation of a horizontal synchronizing signal corresponding to the laser beam L2 is delayed by the time T7 with respect to that corresponding to the laser beam L1.

Further, when times T5 and T6 are found as the count number of the delay clocks and the phase difference of clocks, as described in the slippage detection in the secondary scanning direction, the following processing may be conducted: the horizontal synchronizing signal is adjusted according to the counted number of clocks; and the slippage found as the clock phase difference may be adjusted by selection of dot clocks corresponding to laser beams L1 and L2, from delay clocks dl0 through dl15.

The shape and combination of each detection area of sensors A through D, which are used for detection of slippage in the secondary scanning direction and the primary scanning direction, are not limited to those shown in FIG. 2, but, for example, those of sensors A through D may be structured as shown in FIGS. 10 through 13.

That is, in order to detect slippage in the secondary scanning direction, it is preferable that a combination of sensors exists, in which ends of the fronts of the primary scanning direction of the light beam detection areas are not parallel with each other. In order to detect slippage in the primary scanning direction, it is preferable that a combination of sensors exists, in which ends of the fronts of the primary scanning direction of the light beam detection area are perpendicular to the primary scanning direction and parallel with the primary scanning direction. Further, when the end of the front of the primary scanning direction of the light beam detection area is regulated, the shape of the detection area may be a triangle or a square.

Figure 14:
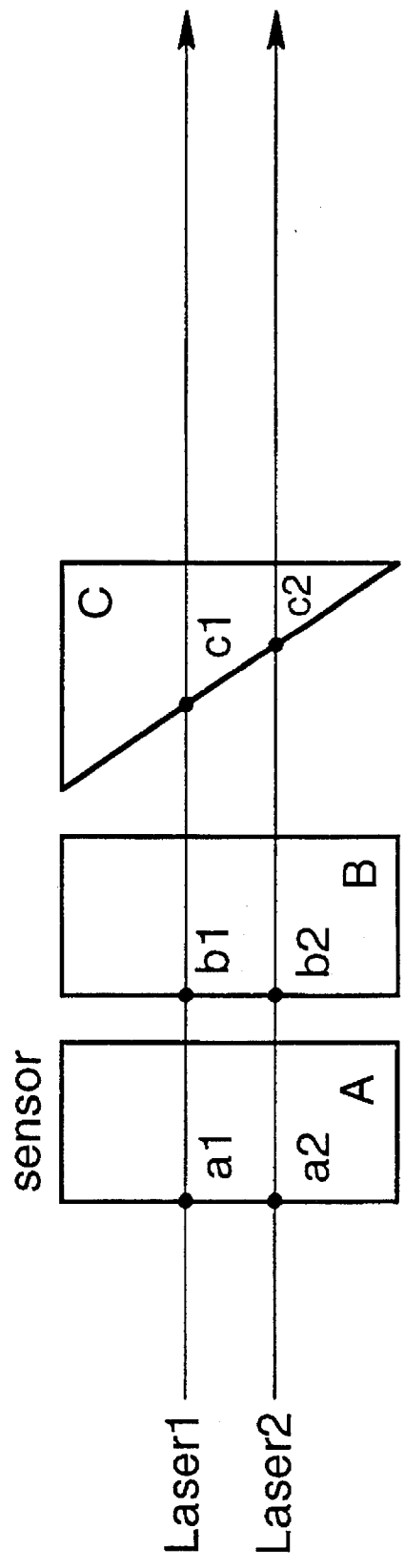
FIG. 14 is a view showing the sensor construction having three sensors.

Further, in the foregoing description, the system is structured by 4 sensors, that is, a pair of sensors used for the slippage detection in the secondary scanning direction, and a pair of sensors used for the slippage detection in the primary scanning direction, however, the same function as that of the foregoing, can be accomplished by 3 sensors A through C as shown in FIG. 14.

That is, in the structure shown in FIG. 14, two sensors A and B provided in the square light beam detection area are arranged in the manner that ends of the fronts of the primary scanning direction of the detection areas are perpendicular to the primary scanning direction, and on the other hand, the sensor C is arranged so that the hypotenuse of the triangle of the light beam detection area, in which sensor C is positioned on the front of the primary scanning direction, obliquely crosses the primary scanning direction.

Figure 15:
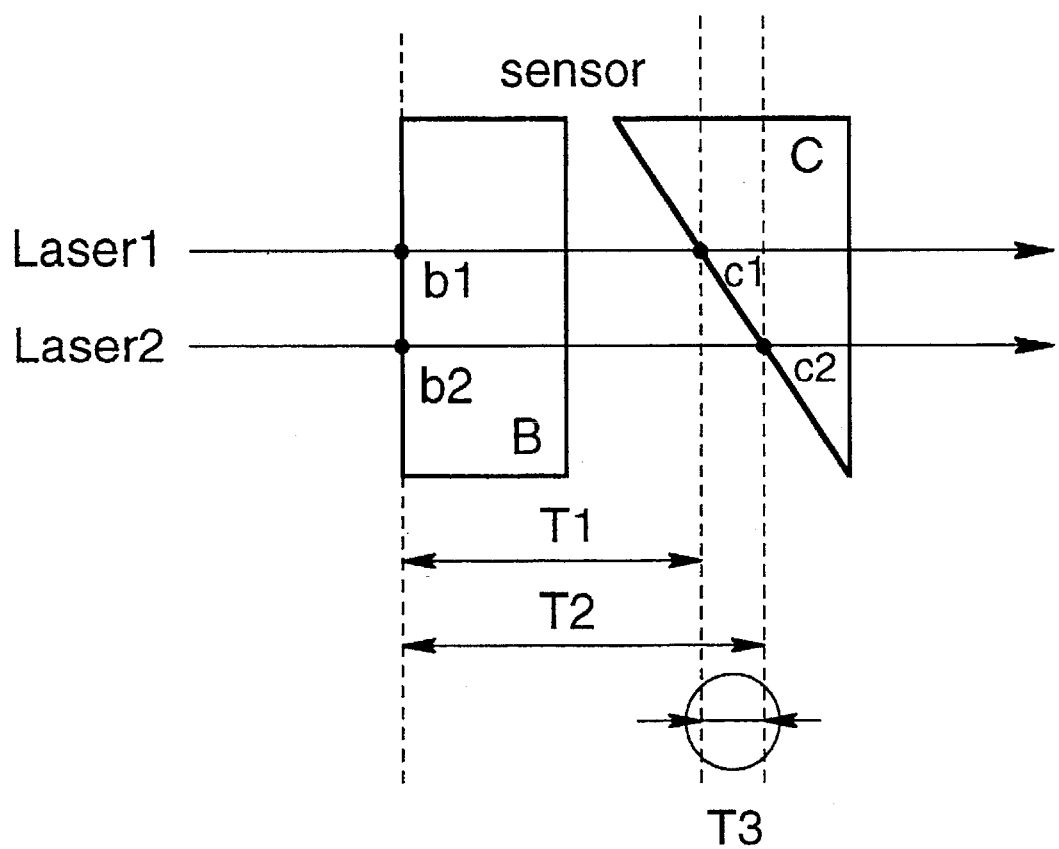
FIG. 15 is a view showing the slippage detection in the secondary scanning direction by the three sensors.

In the composition of sensors shown in FIG. 14, when the slippage in the secondary scanning direction is detected, a combination of, for example, sensors B and C is used (refer to FIG. 15). Although the end of the front of the primary scanning direction of the detection area of sensor B is perpendicular to the primary scanning direction, the end of the front of the primary scanning direction of the detection area of sensor C obliquely crosses the primary scanning direction. Accordingly, when the slippage in the secondary scanning direction occurs, the slippage is found as the change of the difference of time detected by sensors B and C, so that the slippage in the secondary scanning direction can be detected (refer to FIG. 15).

Here, the end of the front of the primary scanning direction of the detection area of sensor B is perpendicular to the primary scanning direction, the slippage in the secondary scanning direction does not greatly influence the time, comparing with the case where a combination of sensors B and C, shown in FIG. 2 or FIG. 4 (or FIGS. 10 through 13), is used. Concerning the accuracy of the system, it is preferable that the ends of the fronts of the primary scanning direction of the detection areas obliquely cross respectively the primary scanning direction as sensors B and C shown in FIG. 2 or FIG. 4 (or FIGS. 10 through 13), and that a combination of sensors is used in which the direction of inclination differ from each other.

Figure 16:
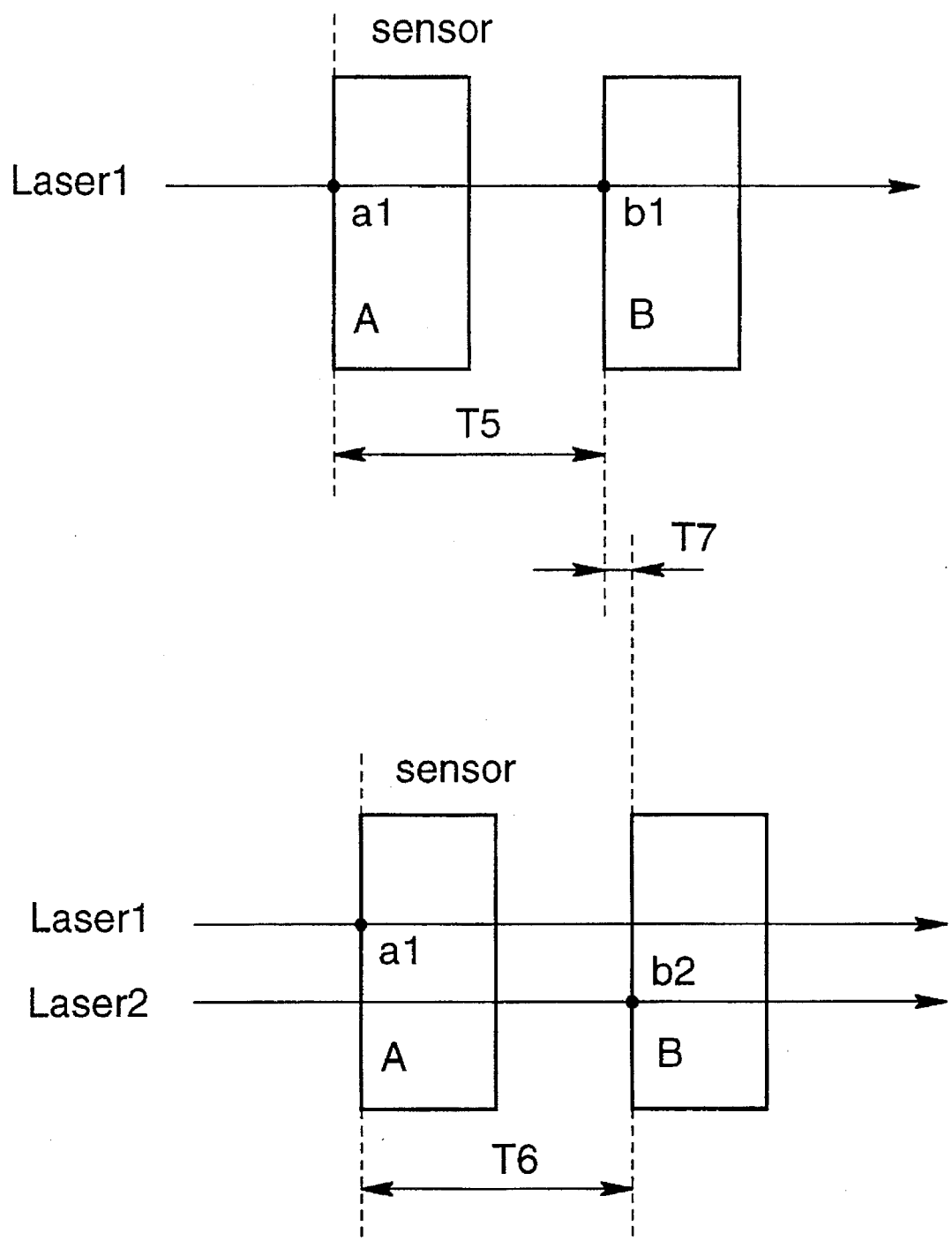
FIG. 16 is a view showing the slippage detection in the primary scanning direction by the three sensors.
Figure 17:
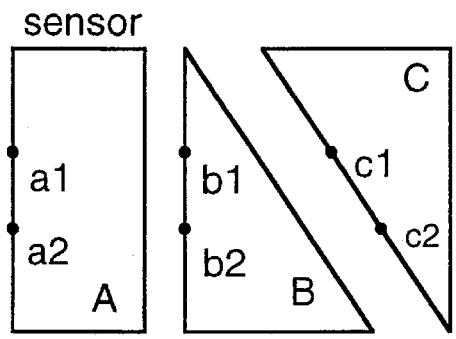
FIG. 17 is a view showing another example of sensor construction.
Figure 18:
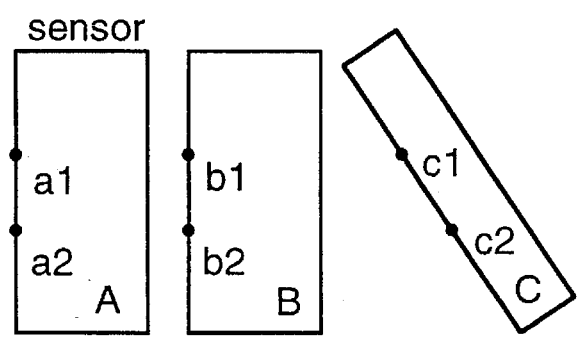
FIG. 18 is a view showing another example of sensor construction.
Figure 19:
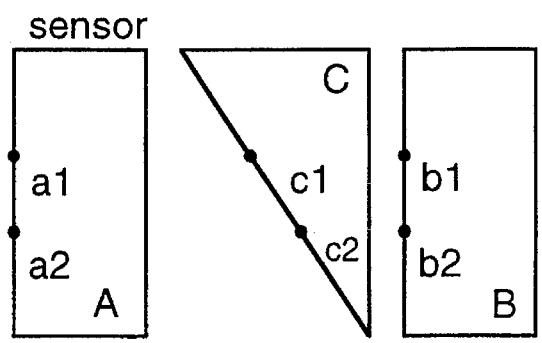
FIG. 19 is a view showing the sensor construction by three sensors.
Figure 20:
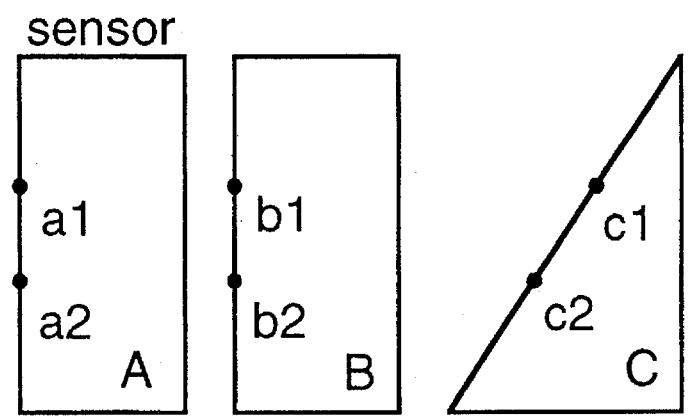
FIG. 20 is a view showing another example of sensor construction.

Further, when the slippage in the primary scanning direction is detected by sensors A through C as shown in FIG. 14, the slippage can be detected by a combination of sensors A and B, as shown in FIG. 16, in the same way as the foregoing.

That is, even when the system is structured by 3 sensors A through C as shown in FIG. 14, the slippage can be detected as follows: when a combination, in which the ends of the fronts of the primary scanning direction of the light beam detection areas are not parallel with each other, and a combination, in which the ends of the fronts of the primary scanning direction of the light beam detection areas are parallel with each other in the secondary scanning direction, are provided, in other words, when a pair of sensors in which the ends of the fronts of the primary scanning direction are parallel with each other in the secondary scanning direction, and a sensor, in which the end of the front of the primary scanning direction obliquely crosses the primary scanning direction, are provided in the system, slippage in both the secondary scanning direction and in the primary scanning direction can be detected.

Accordingly, also in a combination of 3 sensors A through C, the system is not limited to the composition shown in FIG. 14, but many kinds of embodiments, as shown in FIGS. 17 through 20, can easily be considered.

When it is not necessary that the slippage in the primary scanning direction is detected, only a pair of sensors, in which ends of the fronts of the primary scanning direction of the light beam detection areas are not parallel with each other, may be provided in the system.

Further, also in the composition in which 3 lines are simultaneously recorded by 3 laser beams L1, L2 and L3, when the slippage in the secondary scanning direction of two laser beams L1 and L2 is detected by a pair of sensors, and further the slippage of two laser beams L1 and L3 is detected, the slippage of laser beams L2 and L3 in the secondary scanning direction, in the case where the scanning position of laser beam L1 is used as the reference, can be detected. Accordingly, the composition of sensors is not limited to the case of two laser beams L1 and L2.

As described above, due to an image forming apparatus according to the present invention, the slippage of a light beam interval (slippage of the optical axis) in the secondary scanning direction can be detected by a simple construction, which is an effect of the present invention. When the result of the detection is used for adjusting the optical axis, the stable image formation can be carried out.

Further, due to the image forming apparatus according to the present invention, slippage of both the optical axis in the secondary scanning direction and that in the primary scanning direction, can be detected. Accordingly, the optical axis in the secondary scanning direction is defined as a normal position, and the writing control corresponding to the relationship of the position of the light beam in the primary scanning direction can be carried out, which also is another effect of this invention.

What is claimed is:

1. An image forming apparatus for simultaneously recording plural image lines on a recording medium by scanning simultaneously with plural light beams along parallel scanning lines in a primary scanning direction, comprising:

a first light beam detector including a first light beam detecting surface having a specified shape with a first straight starting-edge;

a second light beam detector including a second light beam detecting surface having a specified shape with a second straight starting-edge;

the first and second light beam detecting surfaces arranged in tandem in the primary scanning direction in such a manner that the plural light beams pass over along different scanning lines on the first light beam detecting surface, and thereafter on the second light beam detecting surface, wherein each light beam starts passing over each light beam detecting surface from the straight starting-edge of each light beam detecting surface and each light beam detector outputs a signal when a light beam passes over the light beam detecting surface thereof;

the first straight starting-edge and the second straight starting-edge arranged not to be parallel to each other so that the distance between the first and second straight starting-edge varies depending on a scanning line;

first time measuring means for measuring a first time during which one of the plural light beams passes over on a scanning line from the first straight starting-edge to the second straight starting-edge;

second time measuring means for measuring a second time during which another one of the plural light beams passes over on another scanning line from the first straight starting-edge to the second straight starting-edge;

calculation means for obtaining a difference time between the first and second times; and deviation detection means having a reference time of the difference time, for comparing the obtained difference time with the reference time and for determining a deviation in a distance between the one and the another one of the plural light beams in a secondary scanning direction perpendicular to the primary scanning direction on the basis of the comparison result.

2. An image forming apparatus for simultaneously recording plural image lines on a recording medium by scanning simultaneously with plural light beams along parallel scanning lines in a primary scanning direction, comprising:

a first light beam detector including a first light beam detecting surface having a specified shape with a first straight starting-edge;

a second light beam detector including a second light beam detecting surface having a specified shape with a second straight starting-edge;

the first and second light beam detecting surfaces arranged in tandem in the primary scanning direction in such a manner that the plural light beams pass over along different scanning lines on the first light beam detecting surface, and thereafter on the second light beam detecting surface, wherein each light beam starts passing over each light beam detecting surface from the straight starting-edge of each light beam detecting surface and each light beam detector outputs a signal when a light beam passes over the light beam detecting surface thereof;

the first Straight starting-edge and the second straight starting-edge arranged not to be parallel to each other so that the distance between the first and second straight starting-edges varies depending on a scanning line;

first time measuring means for measuring a first time during which one of the plural light beams passes over on a scanning line from the first straight starting-edge to the second straight starting-edge, the first time measuring means measuring passing times of the one of the plural light beams on the first and second straight starting-edges and obtains the first time as a difference between the passing times;

second time measuring means for measuring a second time during which another one of the plural light beams passes over on another scanning line from the first straight starting-edge to the second straight starting-edge;

calculation means for obtaining a difference time between the first and second times; and deviation detection means having a reference time of the difference time, for comparing the obtained difference time with the reference time and for determining a deviation in a distance between the one and the another one of the plural light beams in a secondary scanning direction perpendicular to the primary scanning direction on the basis of the comparison result.

3. An image forming apparatus for simultaneously recording plural image lines on a recording medium by scanning simultaneously with plural light beams along parallel scanning lines in a primary scanning direction, comprising:

a first light beam detector including a first light beam detecting surface having a specified shape with a first straight starting-edge;

a second light beam detector including a second light beam detecting surface having a specified shape with a second straight starting-edge;

the first and second light beam detecting surfaces arranged in tandem in the primary scanning direction in such a manner that the plural light beams pass over along different scanning lines on the first light beam detecting surface, and thereafter on the second light beam detecting surface, wherein each light beam starts passing over each light beam detecting surface from the straight starting-edge of each light beam detecting surface and each light beam detector outputs a signal when a light beam passes over the light beam detecting surface thereof;

the first straight starting-edge and the second straight starting-edge arranged not to be parallel to each other so that the distance between the first and second straight starting-edges varies depending on a scanning line;

first time measuring means for measuring a first time during which one of the plural light beams passes over on a scanning line from the first straight starting-edge to the second straight starting-edge;

second time measuring means for measuring a second time during which another one of the plural light beams passes over on another scanning line from the first straight starting-edge to the second straight starting-edge, the second time measuring means measuring passing times of the another one of the plural light beams on the first and second straight starting-edges and obtains the second time as a difference between the passing times;

calculation means for obtaining a difference time between the first and second times; and deviation detection means having a reference time of the difference time, for comparing the obtained difference time with the reference time and for determining a deviation in a distance between the one and the another one of the plural light beams in a secondary scanning direction perpendicular to the primary scanning direction on the basis of the comparison result.

4. An image forming apparatus for simultaneously recording plural image lines on a recording medium by scanning simultaneously with plural light beams along parallel scanning lines in a primary scanning direction, comprising:

at least three sets of light beam detectors each including a light beam detecting surface having a specified shape with a straight starting-edge;

the three sets of the light beam detecting surfaces arranged in tandem in the primary scanning direction in such a manner that the plural light beams pass over along different scanning lines on a first one of the light beam detecting surface, then on a second one, thereafter on a third one;

the three sets of the light beam detecting surfaces further arranged in such manner that two straight starting-edges in one combination of the straight starting-edges are in parallel with each other and two straight starting-edges in another combination of the straight starting-edges are not in parallel with each other.

5. The apparatus of claim 1, further comprising a pulse generator for generating pulse signals having a predetermined frequency wherein the first and second time measuring means measure the first time and the second time by counting a number of pulses.

* * * * *